(12) United States Patent
Yamamoto et al.

(10) Patent No.: US 12,551,152 B2
(45) Date of Patent: Feb. 17, 2026

(54) MOOD FORECASTING METHOD, MOOD FORECASTING APPARATUS AND PROGRAM

(71) Applicant: NTT, Inc., Tokyo (JP)

(72) Inventors: Shuhei Yamamoto, Tokyo (JP); Hiroyuki Toda, Tokyo (JP); Takeshi Kurashima, Tokyo (JP); Tomu Tominaga, Tokyo (JP)

(73) Assignee: NTT, Inc., Tokyo (JP)

( * ) Notice: Subject to any disclaimer, the term of this patent is extended or adjusted under 35 U.S.C. 154(b) by 576 days.

(21) Appl. No.: 17/926,611

(22) PCT Filed: May 28, 2020

(86) PCT No.: PCT/JP2020/021082
§ 371 (c)(1),
(2) Date: Nov. 20, 2022

(87) PCT Pub. No.: WO2021/240715
PCT Pub. Date: Dec. 2, 2021

(65) Prior Publication Data
US 2023/0190159 A1 Jun. 22, 2023

(51) Int. Cl.
*A61B 5/16* (2006.01)
*A61B 5/00* (2006.01)
(Continued)

(52) U.S. Cl.
CPC ............ *A61B 5/165* (2013.01); *A61B 5/7267* (2013.01); *G06N 3/0455* (2023.01); *G06N 3/08* (2013.01)

(58) Field of Classification Search
CPC .... A61B 5/165; A61B 5/7267; G06N 3/0455; G06N 3/08; G06N 3/0442
(Continued)

(56) References Cited

U.S. PATENT DOCUMENTS 10,936,947 B1* 3/2021 Flunkert ................ G06N 3/044
10,990,889 B2* 4/2021 Peng ...................... G06N 3/045
(Continued)

OTHER PUBLICATIONS

Nosakhare et al. (2019) "Probabilistic Latent Variable Modeling for Assessing Behavioral Influences on Well-Being", In Proc. of KDD, Aug. 4-8, 2019, Anchorage, AK.
(Continued)

*Primary Examiner* — Pierre E Elisca

(57) ABSTRACT

The present invention can forecast a future-mood and to present the forecasting and a behavior that is the basis of the forecasting by causing a computer to execute: a first-training procedure for training a first-neural network in accordance with behavior time-series data and mood time-series data in each time interval, the first-neural network using behavior time-series data and mood time-series data in a first-time interval as input to output a forecasted-value of behavior time-series data in a time interval following the first-time interval; and a second-training procedure for training a second-neural network in accordance with behavior time-series and mood time-series data per time interval, the second-neural network using the behavior time-series data in the following time interval and the mood time-series data in the first-time interval as input to output a forecasted-value of mood time-series data in the following time interval.

5 Claims, 20 Drawing Sheets

(51) Int. Cl.
*G06N 3/0455* (2023.01)
*G06N 3/08* (2023.01)

(58) Field of Classification Search
USPC .......................................... 434/26
See application file for complete search history.

(56) References Cited

U.S. PATENT DOCUMENTS

2018/0218256 A1* 8/2018 Raviv ................. G06N 3/0455
2021/0392175 A1* 12/2021 Gronau .............. H04L 65/1093
2021/0392231 A1* 12/2021 Gronau .............. H04L 12/1827
2023/0004130 A1* 1/2023 Dowie ............... G05B 13/0265
2024/0403603 A1* 12/2024 Fernandez-Montes Cuberta ........
G06N 3/044

OTHER PUBLICATIONS

Yan et al. (2019) "Estimating Individualized Daily Self-Reported Affect with Wearable Sensors", In Proc. of ICHI.
Spathis et al. (2019) "Sequence Multi-task Learning to Forecast Mental Wellbeing from Sparse Self-reported Data", In Proc. of KDD, Aug. 4-8, 2019, Anchorage, AK.

* cited by examiner

Fig. 4

| DATA ID | DATE AND TIME | NUMBER OF STEPS | EXERCISE TIME | CONVERSATION TIME | |
|---|---|---|---|---|---|
| 1 | 2020/03/01 07:00 | 3000 | 30 min | 0 min | ...... |
| 2 | 2020/03/01 08:00 | 100 | 0 min | 50 min | ...... |
| 3 | 2020/03/01 09:00 | 200 | 0 min | 10 min | ...... |
| 4 | ...... | ...... | ...... | ...... | ...... |
| 5 | ...... | ...... | ...... | ...... | ...... |
| 6 | ...... | ...... | ...... | ...... | ...... |

121

| DATA ID | DATE AND TIME | NUMBER OF STEPS | EXERCISE TIME | CONVERSATION TIME | ...... |
|---|---|---|---|---|---|
| 1 | 2020/03/01 07:00 | 0.5 | 0.1 | 0.0 | ...... |
| 2 | 2020/03/01 08:00 | -1.2 | 0.0 | 0.9 | ...... |
| 3 | 2020/03/01 09:00 | 1.0 | 0.3 | 0.2 | ...... |
| 4 | ...... | ...... | ...... | ...... | ...... |
| 5 | ...... | ...... | ...... | ...... | ...... |
| 6 | ...... | ...... | ...... | ...... | ...... |

| DATA ID | DATE AND TIME | NUMBER OF STEPS |
|---|---|---|
| 1 | 2020/03/01 07:00 | Calm |
| 2 | 2020/03/01 20:00 | Angry |
| 3 | 2020/03/01 23:00 | Happy |
| 4 | ...... | ...... |
| 5 | ...... | ...... |
| 6 | ...... | ...... |

| PARAMETER NAME | PARAMETER VALUE | |
|---|---|---|
| Sensor Embedding Layer | $\begin{bmatrix} 0.1 & \cdots & 0.3 \\ \vdots & \ddots & \vdots \\ 0.2 & \cdots & 0.1 \end{bmatrix} \cdots$ | ~123 |
| RNN Encoding Layer | $\begin{bmatrix} 0.1 & \cdots & 0.3 \\ \vdots & \ddots & \vdots \\ 0.2 & \cdots & 0.1 \end{bmatrix} \cdots$ | |
| Attention | $\begin{bmatrix} 0.1 & \cdots & 0.3 \\ \vdots & \ddots & \vdots \\ 0.2 & \cdots & 0.1 \end{bmatrix} \cdots$ | |

Fig. 13

| PARAMETER NAME | PARAMETER VALUE |
|---|---|
| Mood Embedding Layer | $\begin{bmatrix} 0.1 & \cdots & 0.3 \\ \vdots & \ddots & \vdots \\ 0.2 & \cdots & 0.1 \end{bmatrix} \cdots$ |
| RNN Encoding Layer | $\begin{bmatrix} 0.1 & \cdots & 0.3 \\ \vdots & \ddots & \vdots \\ 0.2 & \cdots & 0.1 \end{bmatrix} \cdots$ |
| Attention | $\begin{bmatrix} 0.1 & \cdots & 0.3 \\ \vdots & \ddots & \vdots \\ 0.2 & \cdots & 0.1 \end{bmatrix} \cdots$ |

| PARAMETER NAME | PARAMETER VALUE | |
|---|---|---|
| RNN Decoding Layer | $\begin{bmatrix} 0.1 & \cdots & 0.3 \\ \vdots & \ddots & \vdots \\ 0.2 & \cdots & 0.1 \end{bmatrix} \cdots$ | ~124 |
| OUTPUT LAYER | {1: "NUMBER OF STEPS"<br>2: "EXERCISE TIME,"<br>3: "CONVERSATION TIME," ...} | |

Fig. 16

| PARAMETER NAME | PARAMETER VALUE | |
|---|---|---|
| RNN Decoding Layer | $\begin{bmatrix} 0.1 & \cdots & 0.3 \\ \vdots & \ddots & \vdots \\ 0.2 & \cdots & 0.1 \end{bmatrix} \cdots$ | ~126 |
| OUTPUT LAYER | {1: "Calm"<br>2: "Happy",<br>3: "Sad", ...} | |

MOOD FORECASTING METHOD, MOOD FORECASTING APPARATUS AND PROGRAM

CROSS-REFERENCE TO RELATED APPLICATIONS

This application is a U.S. National Stage Application filed under 35 U.S.C. § 371 claiming priority to International Patent Application No. PCT/JP2020/021082, filed on 28 May 2020, the disclosure of which is hereby incorporated herein by reference in its entirety.

TECHNICAL FIELD

The present disclosure relates to a mood forecasting method, a mood forecasting apparatus, and a program.

BACKGROUND ART

The proliferation of wearable sensors such as smartwatches, fitness trackers, and smartphones make it possible to easily record a user's biometric information or behavior log (hereinafter referred to as "behavior data"). Detailed analysis of behavior data and psychological states (such as a mood, emotion, or a level of stress) obtained by user self-evaluation is useful for various applications. For example, the capability of estimating a level of stress of the day as a numerical value or forecasting a future mood using the history of a user's behavior data acquired through a smartwatch is useful for various applications such as recommendation of behaviors which are effective in improving the user's psychological state.

In the related art, in a technique of automatically estimating a user's psychological state from such behavior data, obtained data is discretized and converted into a histogram to estimate the level of health or the level of stress using a probabilistic generative model (NPL 1). In addition, there is a technique of recurring, using an operation log acquired from a smartphone or daily series data of screen time, a next day's psychological state (NPL 2).

CITATION LIST

Non-Patent Literature

NPL 1: E. Nosakhare and R. Picard: Probabilistic Latent Variable Modeling for Assessing Behavioral Influences on Well-Being. In Proc. of KDD, 2019.

NPL 2: S. Yan et al.: Estimating Individualized Daily Self-Reported Affect with Wearable Sensors. In Proc. of ICHI, 2019.

NPL 3: D. Spathis, S. Servia-Rodriguez, K. Farrahi, C. Mascolo, and J. Rentflow: Sequence Multi-task Learning to Forecast Mental Wellbeing from Sparse Self-reported Data. In Proc. of KDD, 2019.

SUMMARY OF THE INVENTION

Technical Problem

However, in the above-mentioned methods of the related art, data is separated and statistically processed on a daily basis, and unfortunately a time-series change in a user's mood or emotion at regular intervals is not included.

For example, the method described in NPL 2 includes quantifying mood data posted many times a day, converting it into an average value, and then forecasting an average value of the next day's mood. On the other hand, human mood changes during a day, and unfortunately the change in mood cannot be presented to a user simply by forecasting the average value. In addition, the method described in NPL 3 includes forecasting a series of future mood data from a series of past behavior data, but cannot present a user with interpretability as to why the mood is forecasted. As a result, a user cannot understand what behavior is effective in improving his/her psychological state.

The present disclosure has been made in view of the above points, and an object of the present disclosure is to make it possible to forecast a future mood and to present the forecasting and a behavior that is the basis for the forecasting.

Means for Solving the Problem

To solve the above issue, a computer executes: a first training procedure for training a first neural network in accordance with behavior time-series data and mood time-series data per time interval where a certain period is divided into a plurality of periods, the first neural network using behavior time-series data and mood time-series data in a first time interval as input to output a forecasted value of behavior time-series data in a time interval following the first time interval; and a second training procedure for training a second neural network in accordance with behavior time-series and mood time-series data per time interval where the certain period is divided into a plurality of periods, the second neural network using the behavior time-series data in the following time interval and the mood time-series data in the first time interval as input to output a forecasted value of mood time-series data in the following time interval.

Effects of the Invention

It is possible to forecast a future mood and to present the forecasting and a behavior that is the basis for the forecasting.

BRIEF DESCRIPTION OF DRAWINGS

FIG. 4 is a table indicating a configuration example of a behavior series data base (DB) 121.

FIG. 5 is a table indicating a configuration example of a behavior feature vector data series.

FIG. 6 is a table indicating a configuration example of a mood series data DB 122.

FIG. 12 is a table indicating a configuration example of a behavior series encoding model DB 123.

FIG. 13 is a table indicating a configuration example of a mood series encoding model DB 125.

FIG. 14 is a table indicating a configuration example of a behavior series decoding model DB 124.

FIG. 16 is a table indicating a configuration example of a mood series decoding model DB 126.

DESCRIPTION OF EMBODIMENTS

Figure 1:
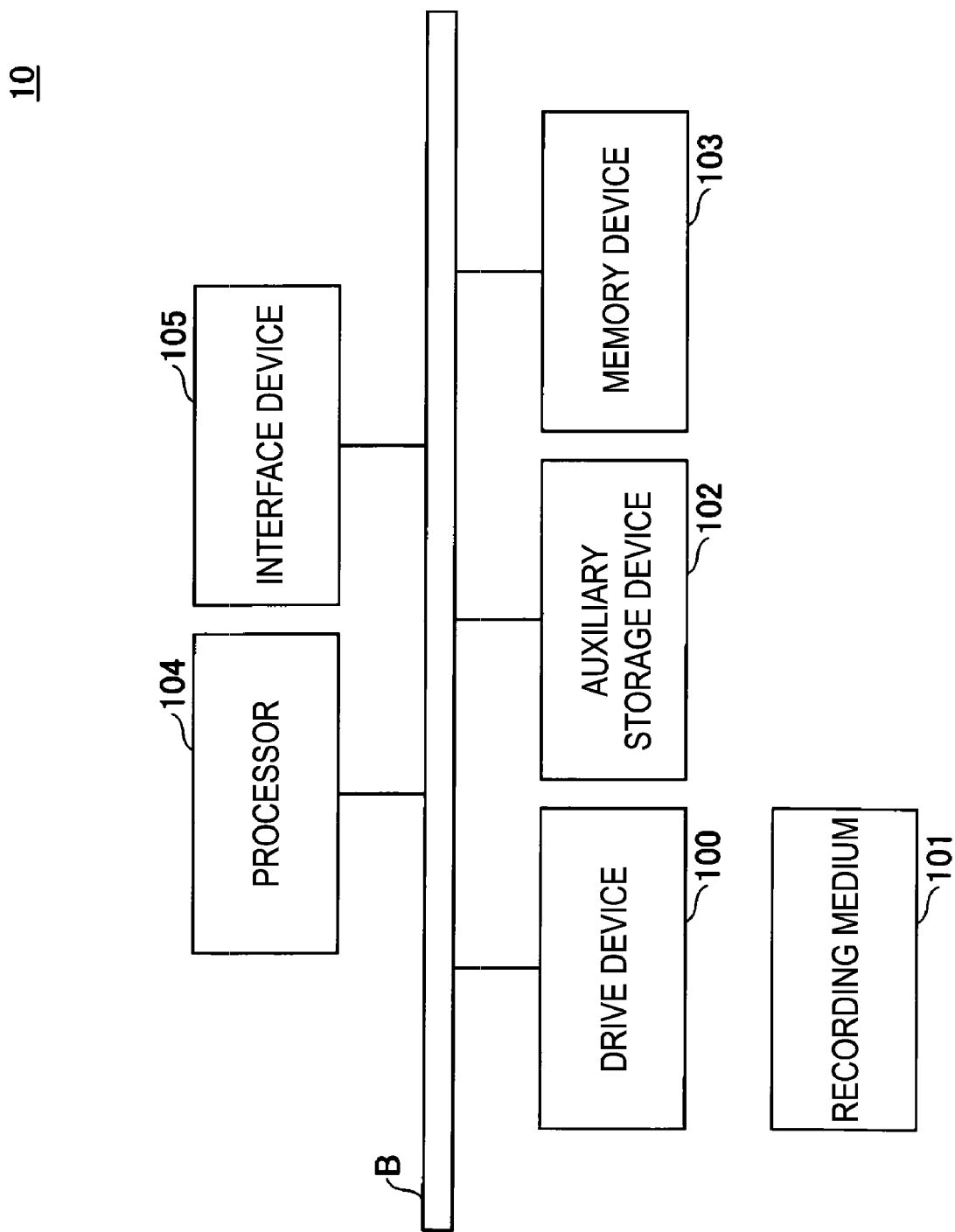
FIG. 1 is a diagram illustrating a hardware configuration example of a mood forecasting apparatus 10 according to an embodiment of the present disclosure.

Hereinafter, an embodiment of the present disclosure will be described with reference to the accompanying drawings. FIG. 1 is a diagram illustrating a hardware configuration example of a mood forecasting apparatus 10 according to the embodiment of the present disclosure. The mood forecasting apparatus 10 illustrated in FIG. 1 includes a drive device 100, an auxiliary storage device 102, a memory device 103, a processor 104, and an interface device 105, which are connected to each other through a bus B.

A program for carrying out processing in the mood forecasting apparatus 10 is provided on a recording medium 101 such as a CD-ROM. When the recording medium 101 having a program stored therein is set in the drive device 100, the program is installed from the recording medium 101 through the drive device 100 to the auxiliary storage device 102. However, the program does not necessarily have to be installed from the recording medium 101, and may be downloaded from another computer through a network. The auxiliary storage device 102 stores the installed program, and stores necessary files, data, or the like. The recording medium that stores the program causes a computer to execute a mood forecasting method.

In response to an activation instruction of a program, the memory device 103 reads out the program from the auxiliary storage device 102 and stores the program. The processor 104 is a CPU or a graphics processing unit (GPU), or a CPU and a GPU, and executes a function related to the mood forecasting apparatus 10 in accordance with the program stored in the memory device 103. The interface device 105 is used as an interface for connection to a network.

In the present embodiment, processing which is executed by the mood forecasting apparatus 10 is classified into a training phase and a forecasting phase. First, the training phase will be described.

Figure 2:
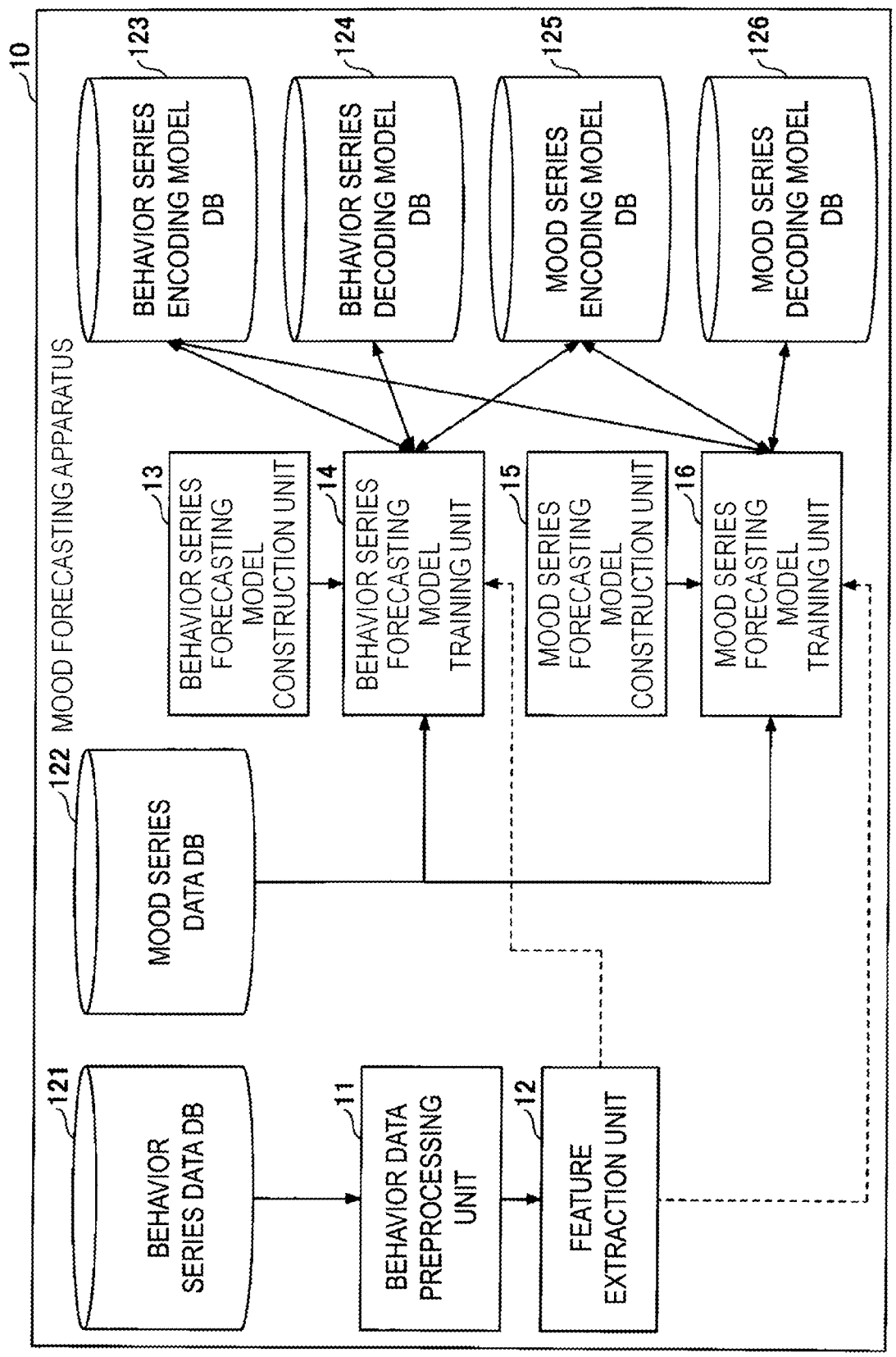
FIG. 2 is a diagram illustrating a functional configuration example in a training phase of the mood forecasting apparatus 10 according to the embodiment of the present disclosure.

FIG. 2 is a diagram illustrating a functional configuration example in the training phase of the mood forecasting apparatus 10 according to the embodiment of the present disclosure. As illustrated in FIG. 2, the mood forecasting apparatus 10 in the training phase includes a behavior data preprocessing unit 11, a feature extraction unit 12, a behavior series forecasting model construction unit 13, a behavior series forecasting model training unit 14, a mood series forecasting model construction unit 15, a mood series forecasting model training unit 16, and the like. Each of these units is realized by one or more programs installed in the mood forecasting apparatus 10 causing the processor 104 to execute processing. In addition, the mood forecasting apparatus 10 uses databases (storage units) such as a behavior series data DB 121, a mood series data DB 122, a behavior series encoding model DB 123, a behavior series decoding model DB 124, a mood series encoding model DB 125, and a mood series decoding model DB 126. Each of these databases is used using, for example, the auxiliary storage device 102, or a storage device connectable to the mood forecasting apparatus 10 through a network.

The mood forecasting apparatus 10 in the training phase uses information of each DB to output neural network model parameters of a behavior series encoding model, a mood series encoding model, a behavior series decoding model, a mood series decoding model, and the like as specific parameters for training data. Here, each piece of data recorded in the behavior series data DB 121 and the mood series data DB 122 is constructed in advance so as to be associated with information on the date and time when the data is recorded.

Figure 3:
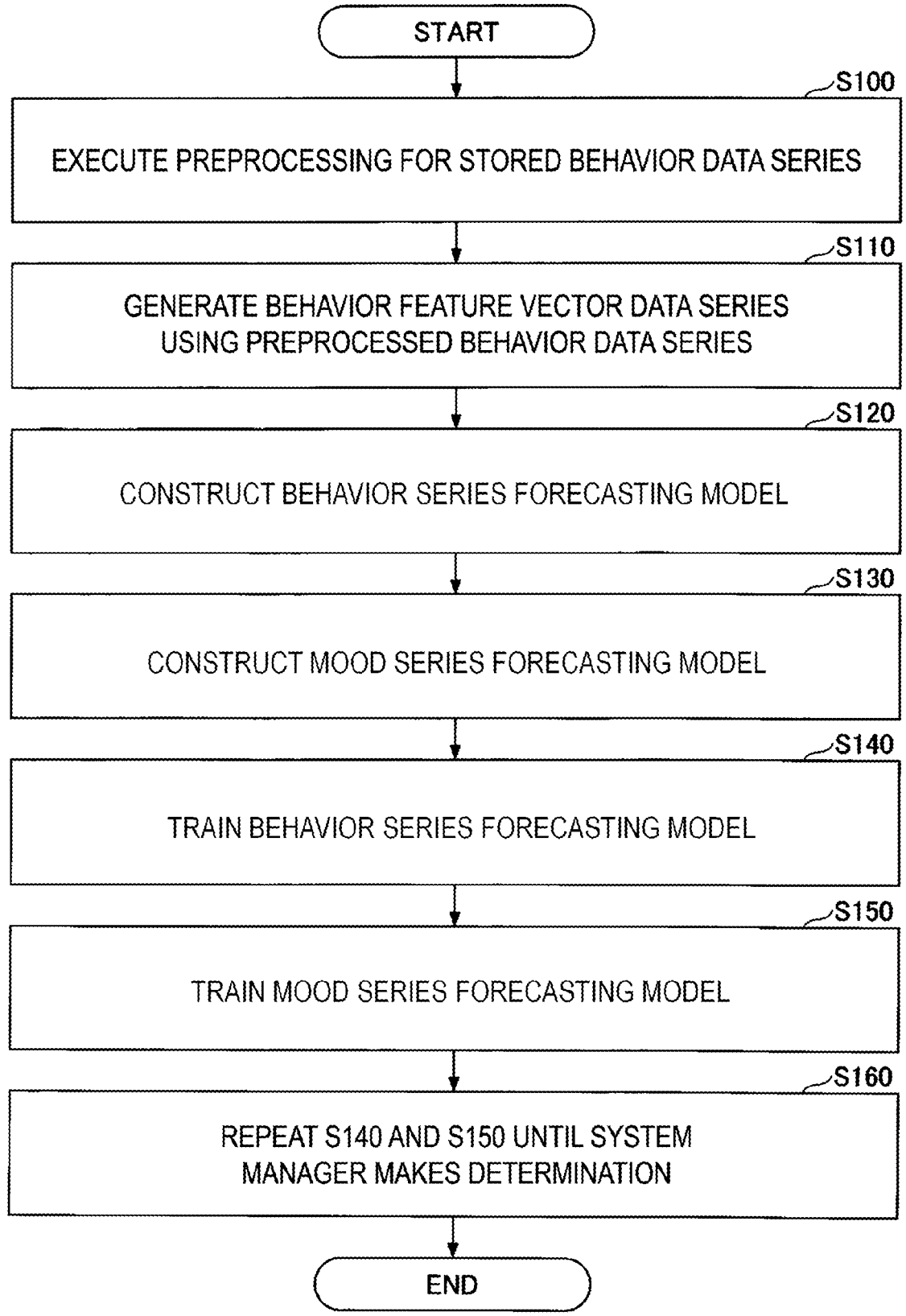
FIG. 3 is a flowchart illustrating an example of a processing procedure which is executed by the mood forecasting apparatus 10 in the training phase.

FIG. 3 is a flowchart illustrating an example of a processing procedure which is executed by the mood forecasting apparatus 10 in the training phase.

In step S100, the behavior data preprocessing unit 11 acquires a series of behavior data (hereinafter referred to as a "behavior data series") stored in the behavior series data DB 121 and executes preprocessing for the behavior data series. As a result, a preprocessed behavior data series is generated.

FIG. 4 is a table indicating a configuration example of the behavior series data DB 121. One row in FIG. 4 is equivalent to one piece of behavior data. In each piece of behavior data, values are recorded in the form of numerical values, times, character strings, and the like in items (columns) indicating various behaviors, and the date and time information for association with mood data as described above is recorded. Specifically, each piece of behavior data includes a data ID, a date and time, the number of steps, an exercise time, a conversation time, and the like. In the present embodiment, in the behavior series data DB 121, behavior data relating to behaviors of a certain person (hereinafter referred to as a "user A") at a plurality of timings in a certain period (hereinafter referred to as a "period T1") is stored in a time series.

The behavior data is recorded, for example, at fixed time intervals. In the present embodiment, an example in which the behavior data is recorded at one hour intervals is indicated. The data ID is identification information of the behavior data. The date and time is a date and time when the behavior data has been recorded. The number of steps is the number of steps in the most recent fixed time (hereinafter referred to as a "target period") until a time when the behavior data is recorded. The exercise time is a time during which exercise has been performed in the target period. The conversation time is a time during which conversation has been performed in the target period. Meanwhile, in the present embodiment, "number of steps," "exercise time,"

and "conversation time" are examples of names of behaviors (hereinafter referred to as "behavior names"). Items with these behavior names as item names are hereinafter referred to as "behavior items".

Next, the feature extraction unit 12 receives the preprocessed behavior data series from the behavior data preprocessing unit 11 and generates a series of behavior feature vector data (hereinafter referred to as a "behavior feature vector data series") based on the preprocessed data series (S110). The details of the process of generating a behavior feature vector data series will be described below.

FIG. 5 is a table indicating a configuration example of a behavior feature vector data series. One row in FIG. 5 is equivalent to one piece of behavior feature vector data. As illustrated in FIG. 5, the behavior feature vector data has the same configuration as the behavior data. However, the value of the behavior item is normalized.

Next, the behavior series forecasting model construction unit 13 constructs a behavior series forecasting model (S120). The construction of a model involves, for example, loading a program as a model into the memory device 103. Meanwhile, the details of the structure of the behavior series forecasting model will be described below.

Next, the mood series forecasting model construction unit 15 constructs a mood series forecasting model (S130). The details of the structure of the mood series forecasting model will be described below.

Next, the behavior series forecasting model training unit 14 receives the behavior feature vector data series from the feature extraction unit 12, acquires a series of mood data (hereinafter referred to as a "mood data series") from the mood series data DB 122, receives the behavior series forecasting model from the behavior series forecasting model construction unit 13, and trains the behavior series forecasting model (S140). The behavior series forecasting model training unit 14 outputs a model parameter group of the trained behavior series forecasting model to the behavior series encoding model DB 123, the behavior series decoding model DB 124, and the mood series encoding model DB 125. Meanwhile, in a case where a trained model parameter group is present in each DB which is an output destination, the behavior series forecasting model training unit 14 retrains the model after the parameter group of the model is received and outputs the retrained model parameter group to a DB corresponding to each model parameter.

FIG. 6 is a diagram illustrating a configuration example of the mood series data DB 122. One row in FIG. 6 is equivalent to one piece of mood data. In the present embodiment, in the mood series data DB 122, mood data relating to a mood of the user A at a plurality of timings in the period T1 is stored in a time series.

Each piece of mood data includes a data ID, a date and time, a mood, and the like. The data ID is identification information of the mood data. The date and time is a date and time when the mood of the user A is evaluated. The mood is a character string indicating the type of mood (hereinafter referred to as a "mood name") reported by the user A. The mood is assumed to be, for example, the psychological state, a level of stress, or the like felt by the user A at every time. In the example of FIG. 6, the value of the mood is a character string, but the mood may be expressed as a numerical value. The mood series data DB 122 may be formed, for example, by the user A inputting the self-evaluation result of the mood and storing the mood data including the input self-evaluation result in the "mood" and including the input date and time in the "date and time" in the DB.

Next, the mood series forecasting model training unit 16 receives the behavior feature vector data series from the feature extraction unit 12, acquires the mood data series from the mood series data DB 122, receives the mood series forecasting model from the mood series forecasting model construction unit 15, and trains the mood series forecasting model (S150). The mood series forecasting model training unit 16 outputs a model parameter group of the trained mood series forecasting model to the behavior series encoding model DB 123, the mood series encoding model DB 125, and the mood series decoding model DB 126. Meanwhile, in a case where a trained model parameter group is included in each DB which is an output destination, the mood series forecasting model training unit 16 retrains the model after the model parameter group is received and outputs the retrained model parameter group to a DB corresponding to each model parameter.

Meanwhile, steps S140 and S150 are repeated until convergence conditions determined by a system manager are satisfied.

Figure 7:
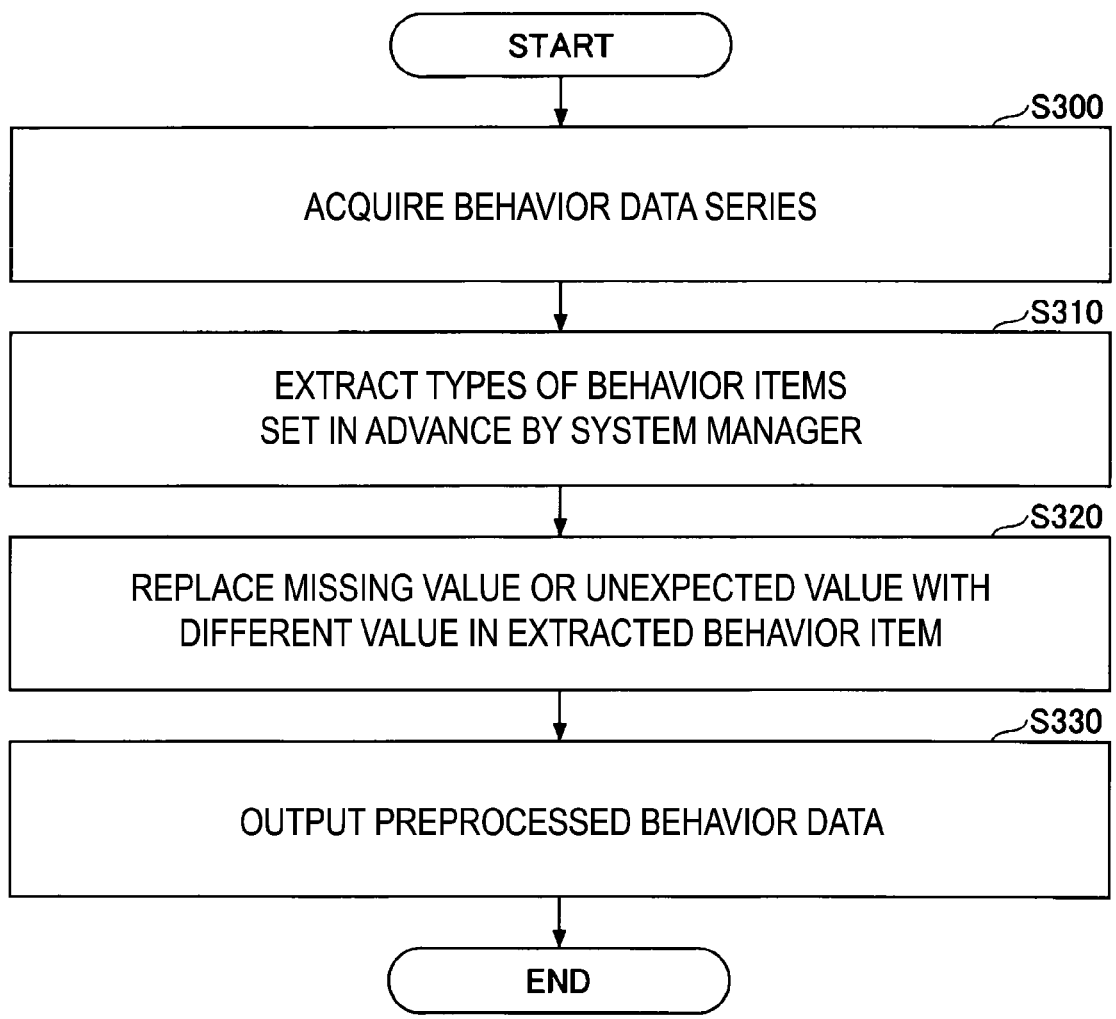
FIG. 7 is a flowchart illustrating an example of a processing procedure for preprocessing of a behavior data series.

Next, the details of step S100 will be described. FIG. 7 is a flowchart illustrating an example of a processing procedure for preprocessing of a behavior data series.

In step S300, the behavior data preprocessing unit 11 acquires a behavior data series from the behavior series data DB 121 (FIG. 4). The behavior data series indicates a behavior of the user A in a time series.

Next, the behavior data preprocessing unit 11 extracts one or more types of behavior items set in advance by the system manager from each piece of behavior data (S310). For example, the item name (such as "number of steps," "exercise time," or "conversation time") of a behavior item to be extracted is set, and a behavior item coincident with the item name is specified. Hereinafter, the specified behavior item is referred to as a "target item". Meanwhile, all behavior items included in the behavior data may be target items.

Next, the behavior data preprocessing unit 11 scans the value of the target item in the behavior data series, and in a case where there is behavior data in which the target item is a missing value or behavior data in which an unexpected value is included in the target item, the behavior data preprocessing unit 11 replaces the value of the target item in the behavior data with a different value (S320). For example, in a case where the target item is numerical data, the value of the target item in the behavior data may be replaced with 0 or an average value of valid values in the behavior data series. In a case where the target item is character string type data, a character string indicating a missing value may be inserted in the target item of the behavior data.

Next, the behavior data preprocessing unit 11 outputs a series of preprocessed behavior data including the data ID and the date and time of the behavior data and the target item after conversion to the feature extraction unit 12 for each piece of behavior data before conversion (S330). That is, the preprocessed behavior data does not include behavior items which are not target items.

Figure 8:
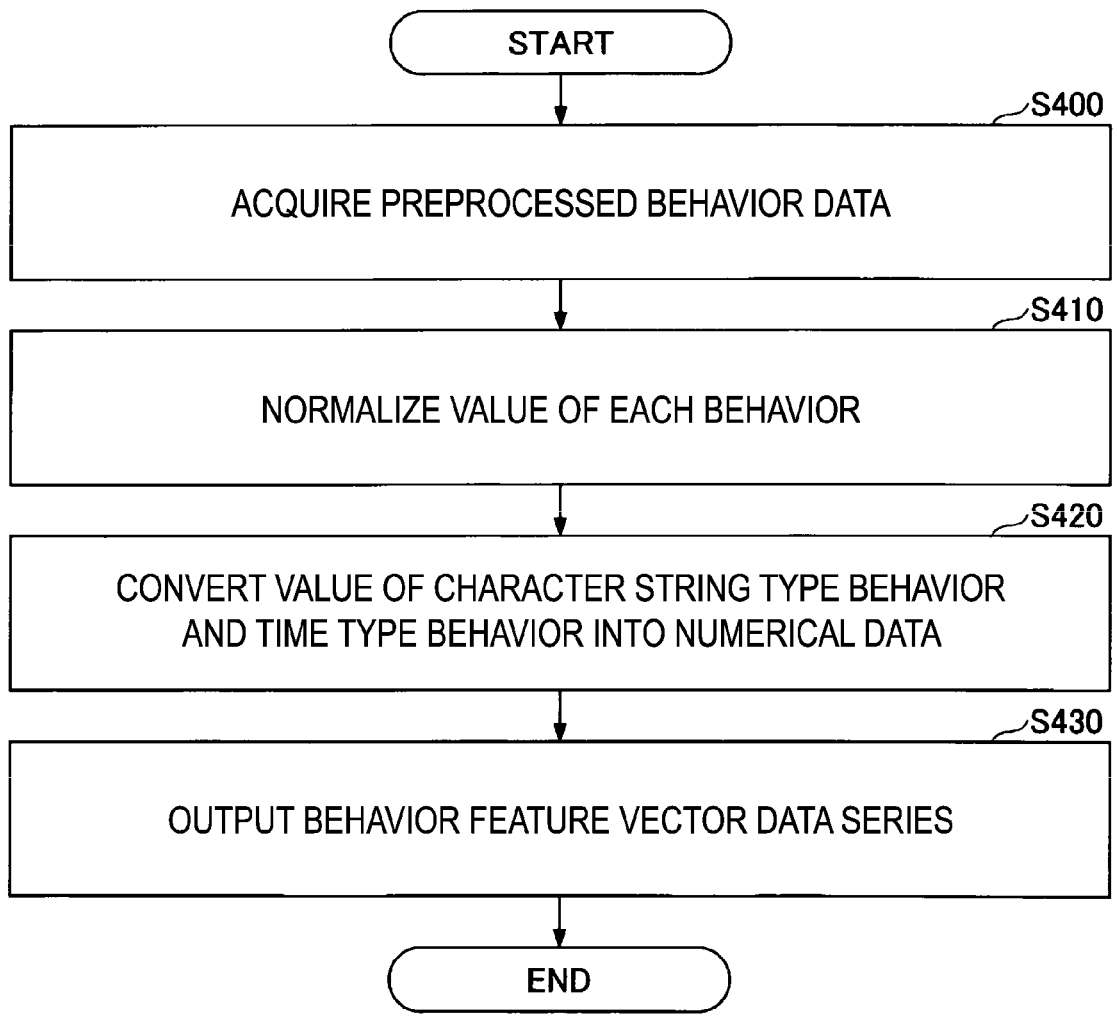
FIG. 8 is a flowchart illustrating an example of a processing procedure for a process of generating a behavior feature vector data series.

Next, the details of step S110 in FIG. 3 will be described. FIG. 8 is a flowchart illustrating an example of a processing procedure for a process of generating a behavior feature vector data series.

In step S400, the feature extraction unit 12 acquires the preprocessed behavior data series output from the behavior data preprocessing unit 11.

Next, the feature extraction unit 12 scans each behavior item of the preprocessed behavior data series and normalizes the value of the behavior item (S410). For example, the feature extraction unit 12 normalizes the values of the behavior items of numerical data so that the average is 0 and the standard deviation is 1.

Next, the feature extraction unit 12 scans each behavior item of the preprocessed behavior data series and converts the value of the character string type or time type item into numerical data (S420). For example, the character string type data is converted into a vector of a one-hot expression in which the type of character string is the number of dimensions and the dimension corresponding to the character string indicated by the data is 1.

Next, the feature extraction unit 12 generates behavior feature vector data having the date and time and each behavior item of the preprocessed behavior data as elements for each piece of preprocessed behavior data and outputs a series of the behavior feature vector data (S430).

Figure 9:
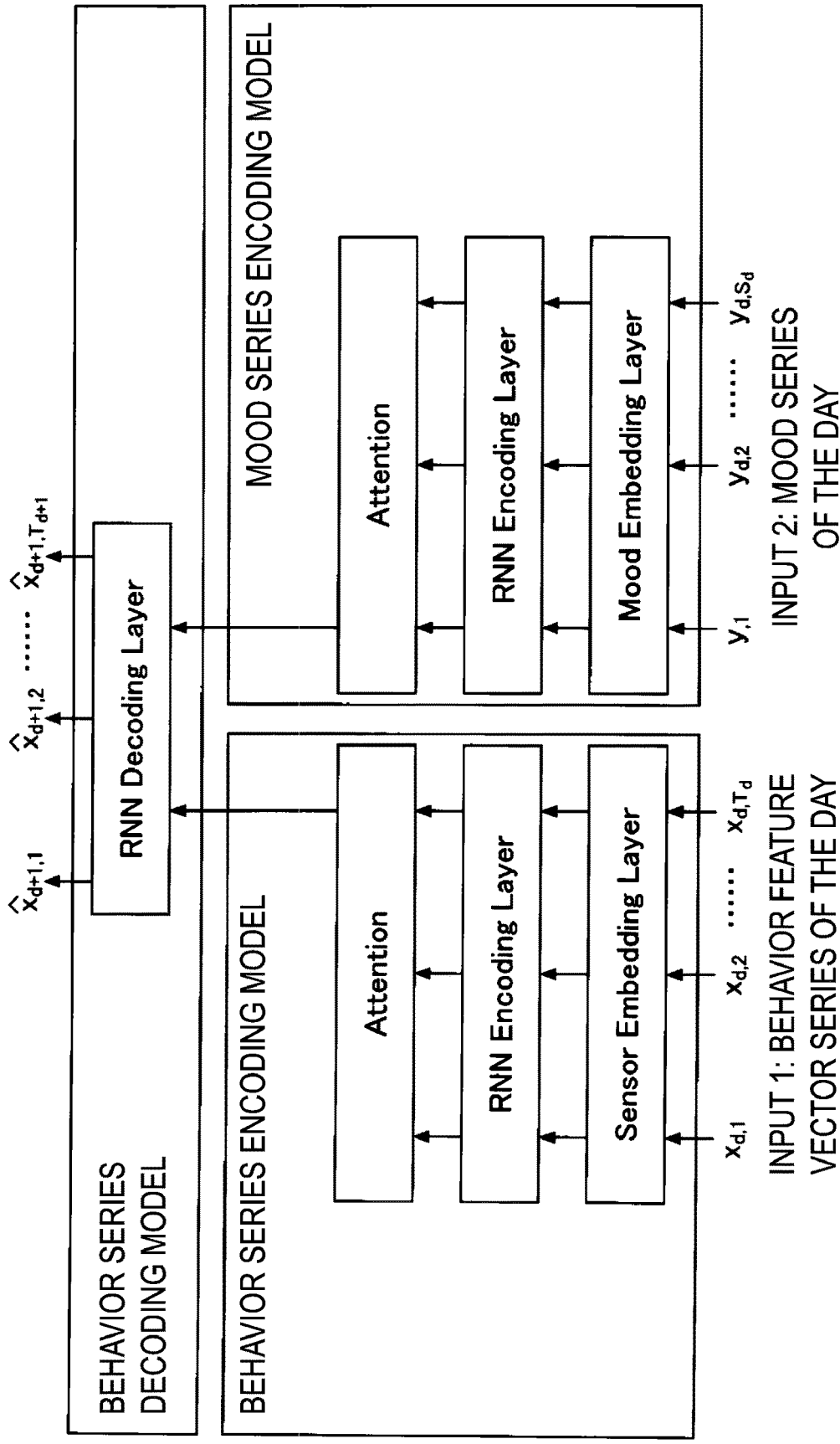
FIG. 9 is a diagram illustrating an example of a structure of a behavior series forecasting model.

Next, the details of step S120 in FIG. 3 will be described. FIG. 9 is a diagram illustrating an example of a structure of a behavior series forecasting model. As illustrated in FIG. 9, the behavior series forecasting model has a structure of a deep neural network (DNN).

The behavior series forecasting model inputs a behavior feature vector series of the day before a forecasting target day (hereinafter referred to as "the day") and a series of mood names of the day in the time-series order (hereinafter referred to as a "mood series"), and outputs the next day's behavior feature vector series of the user A. The behavior feature vector is a vector having the value of a behavior item included in the behavior feature vector data (FIG. 5) as an element.

The behavior series forecasting model includes three components.

First Component

The first component is a behavior series encoding model and includes the following three units.

The first unit is a Sensor Embedding Layer that extracts a highly abstract feature from the behavior feature vector series. After the behavior feature vector series is converted in the fully connected layer, the unit converts the input feature (behavior feature vector series) nonlinearly using, for example, a Sigmoid function, a ReLu function, or the like, and obtains a feature vector.

The second unit is an RNN Encoding Layer that further abstracts the abstracted feature vector as series data (a series feature vector), and is implemented using a known technique such as, for example, a long-short term memory (LSTM). Specifically, the unit receives and abstracts the abstracted feature vector sequentially and repeatedly executes nonlinear conversion while taking the past abstracted information into account in the RNN Encoding Layer.

The third unit is an Attention (attention mechanism) that obtains a feature vector considering the degree of importance of each abstracted series feature vector. For example, a known Attention is realized by two fully connected layers. The first fully connected layer outputs a context vector of any size using the series feature vector as an input, and the second fully connected layer outputs a scalar value equivalent to the importance using the context vector as an input. The context vector may undergo a nonlinear conversion process. The importance is converted into a value corresponding to a probability value by, for example, a softmax function or the like. The weighted average of the series feature vectors using the importance is an output of Attention.

Second Component

The second component is a mood series encoding model. The mood series encoding model converts the mood series into an appropriate feature vector. The mood series encoding model includes three units similarly to the behavior series encoding model.

The first unit is a Mood Embedding Layer and has the same function as the Sensor Embedding Layer.

The second unit is an RNN Encoding Layer and has the same function as the RNN Encoding Layer of the behavior series encoding model.

The third unit is an Attention and has the same function as the Attention of the behavior series encoding model.

Third Component

The third component is a behavior series decoding model. The behavior series decoding model uses feature vectors output from the behavior series encoding model and the mood series encoding model as input and outputs a behavior feature vector series which is a forecasting result. The behavior series decoding model includes one unit.

The one unit is an RNN Decoding Layer and is implemented by a known technique such as, for example, an LSTM. Specifically, the RNN Decoding Layer combines two feature vectors obtained by the behavior series encoding model and the mood series encoding model, adds an appropriate symbol meaning the beginning of the next day's behavior series, and inputs the symbol to the LSTM. As a result, the next day's first behavior feature vector is acquired as an output. After that, a behavior feature vector acquired as a previous output is replaced with the appropriate symbol described above, and the same process is sequentially performed. As a result, the next day's behavior feature vector series is obtained.

Figure 10:
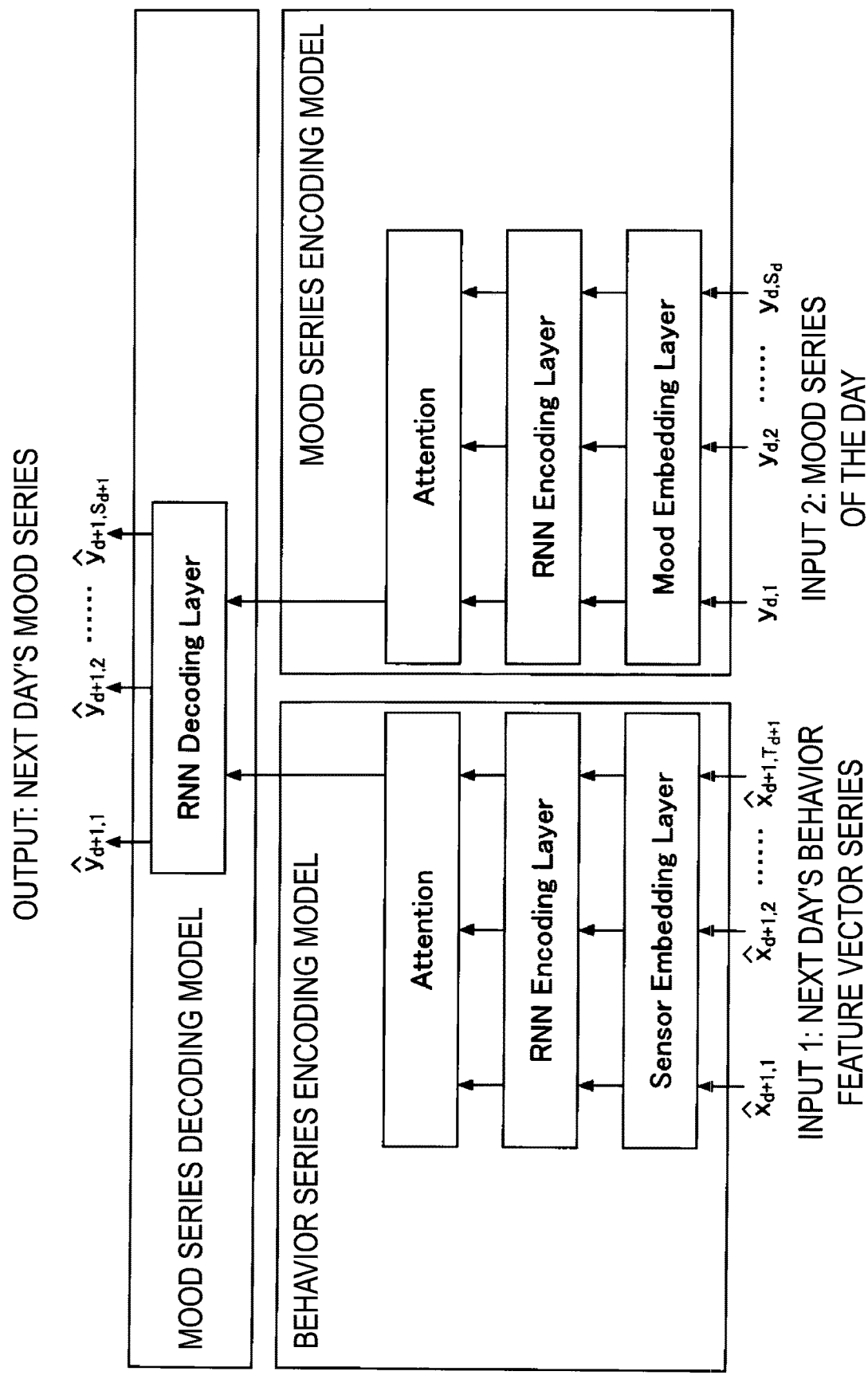
FIG. 10 is a diagram illustrating an example of a structure of a mood series forecasting model.

Next, the details of step S130 in FIG. 3 will be described. FIG. 10 is a diagram illustrating an example of a structure of a mood series forecasting model. As illustrated in FIG. 10, the mood series forecasting model has a structure of a DNN.

The mood series forecasting model uses the mood series of the day and the behavior feature vector series of the day after the day as input to output the next day's mood series of the user A. The mood series forecasting model includes three components.

The first and second components are a behavior series encoding model and a mood series encoding model, and the components are obtained by copying the behavior series encoding model and the mood series encoding model of the behavior series forecasting model described above.

The third component is a mood series decoding model. The mood series decoding model uses feature vectors output from the behavior series encoding model and the mood series encoding model as input and outputs a next day's mood series which is a forecasting result. The mood series decoding model includes one unit.

The one unit is an RNN Decoding Layer and is implemented by a known technique such as, for example, an LSTM. Specifically, the RNN Decoding Layer combines two feature vectors obtained by the behavior series encoding model and the mood series encoding model, adds an appropriate symbol meaning the beginning of the next day's mood series, and inputs the symbol to the LSTM. As a result, the next day's first mood name is acquired as an output. After that, a mood name acquired as a previous output is replaced with the appropriate symbol described above, and the same process is sequentially performed. As a result, the next day's mood series is obtained.

Figure 11:
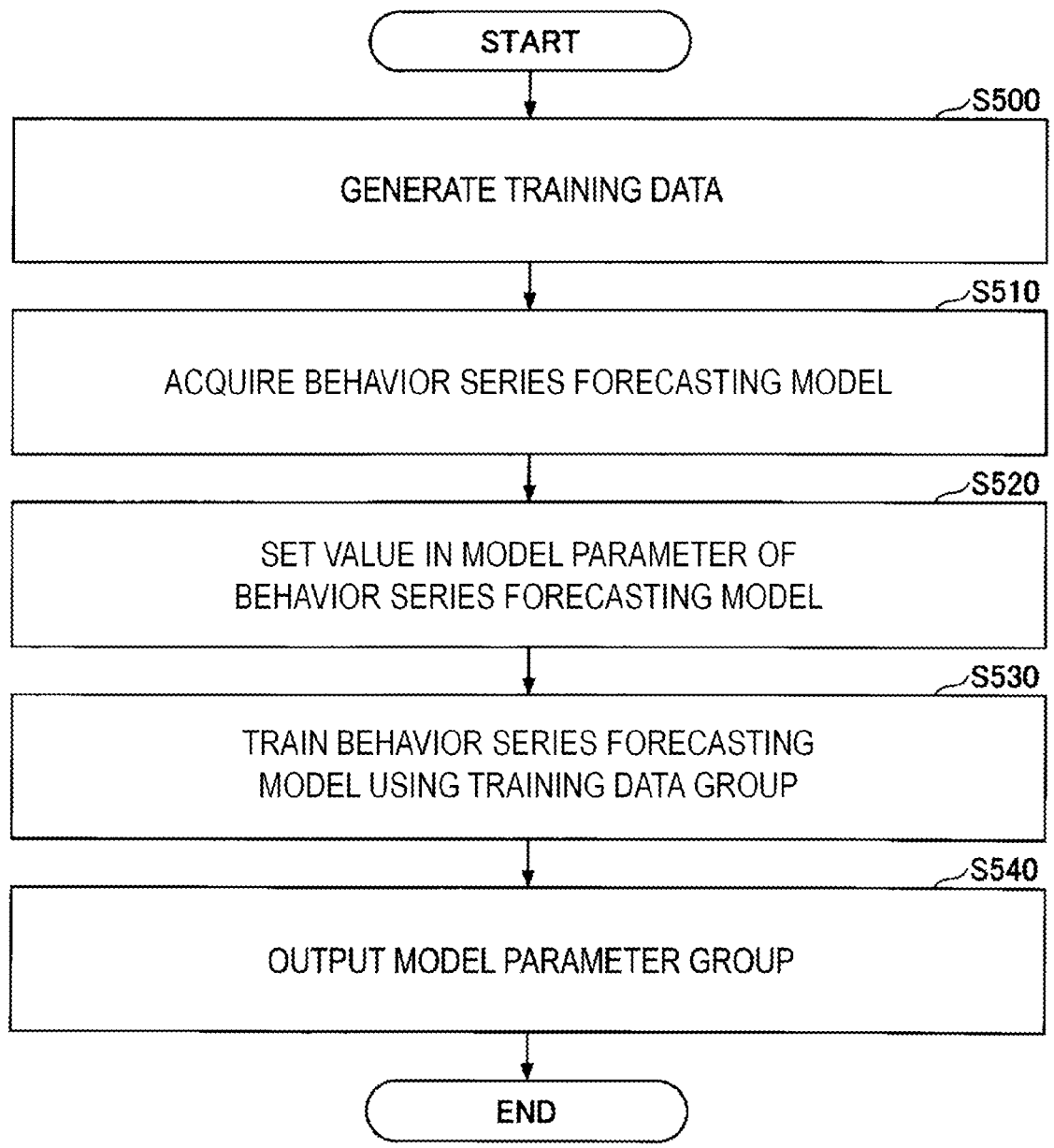
FIG. 11 is a flowchart illustrating an example of a processing procedure for a process of training a behavior series forecasting model.

Next, the details of step S140 in FIG. 3 will be described. FIG. 11 is a flowchart illustrating an example of a processing procedure for a process of training a behavior series forecasting model.

In step S500, the behavior series forecasting model training unit 14 generates training data of the behavior series forecasting model based on the received behavior feature vector data series (FIG. 5) and the received mood data series (FIG. 6).

Specifically, the behavior series forecasting model training unit 14 generates training data every day (date) including, as input data, the behavior feature vector series based on the behavior feature vector data series including the "date and time" related to the day and the mood series based on the mood data series including the "date and time" related to the day and including, as output data, the behavior feature vector series based on the behavior feature vector data series including the "date and time" related to the day after the day. Accordingly, the training data is generated every date (every day).

Next, the behavior series forecasting model training unit 14 receives the behavior series forecasting model as illustrated in FIG. 9 from the behavior series forecasting model construction unit 13 (S510). Hereinafter, the behavior series forecasting model is referred to as a "target model".

Next, the behavior series forecasting model training unit 14 sets a value in the model parameter of the target model (S520). Specifically, the behavior series forecasting model training unit 14 accesses a DB such as the behavior series encoding model DB 123, the behavior series decoding model DB 124, and the mood series encoding model DB 125 (hereinafter referred to as a "target model DB"), and in a case where the value of the model parameter of the model that has already been trained is saved in each of these DBs, the behavior series forecasting model training unit 14 sets the value saved in each target model DB as the model parameter of each component of the target model. On the other hand, in a case where the parameter of the trained model is not saved in each of these target model DBs, the behavior series forecasting model training unit 14 initializes the model parameter of each component of the target model with, for example, a random number between 0 and 1. Meanwhile, the behavior series encoding model DB 123 is a DB that stores the values of the model parameters of the trained behavior series encoding model. The behavior series decoding model DB 124 is a DB that stores the values of the model parameters of the trained behavior series decoding model. The mood series encoding model DB 125 is a DB that stores the values of the model parameters of the trained mood series encoding model.

Next, the behavior series forecasting model training unit 14 trains the target model using a training data group (S530). Specifically, the behavior series forecasting model training unit 14 inputs the behavior feature vector series and the mood series included in the training data as input data for each piece of training data into the target model, and updates the model parameters of the target model based on the comparison between the behavior feature vector series output from the target model and the behavior feature vector series included as output data in the training data.

Next, the behavior series forecasting model training unit 14 outputs a model parameter group of the trained target model and stores the output result in each target model DB (S540).

FIG. 12 is a table indicating a configuration example of the behavior series encoding model DB 123. As illustrated in FIG. 12, in the behavior series encoding model DB 123, the values of the model parameters of each unit of the trained behavior series encoding model are stored as a matrix or a vector.

FIG. 13 is a table indicating a configuration example of the mood series encoding model DB 125. As illustrated in FIG. 13, in the mood series encoding model DB 125, the values of the model parameters of each unit of the trained mood series encoding model are stored as a matrix or a vector.

FIG. 14 is a table indicating a configuration example of the behavior series decoding model DB 124. As illustrated in FIG. 14, in the behavior series decoding model DB 124, the values of the model parameters of each unit of the trained behavior series decoding model are stored as a matrix or a vector. In addition, for the output layer, the size of the output vector is adjusted so that the same index as the input behavior data is assigned, and each index and the corresponding behavior name are stored as text.

Figure 15:
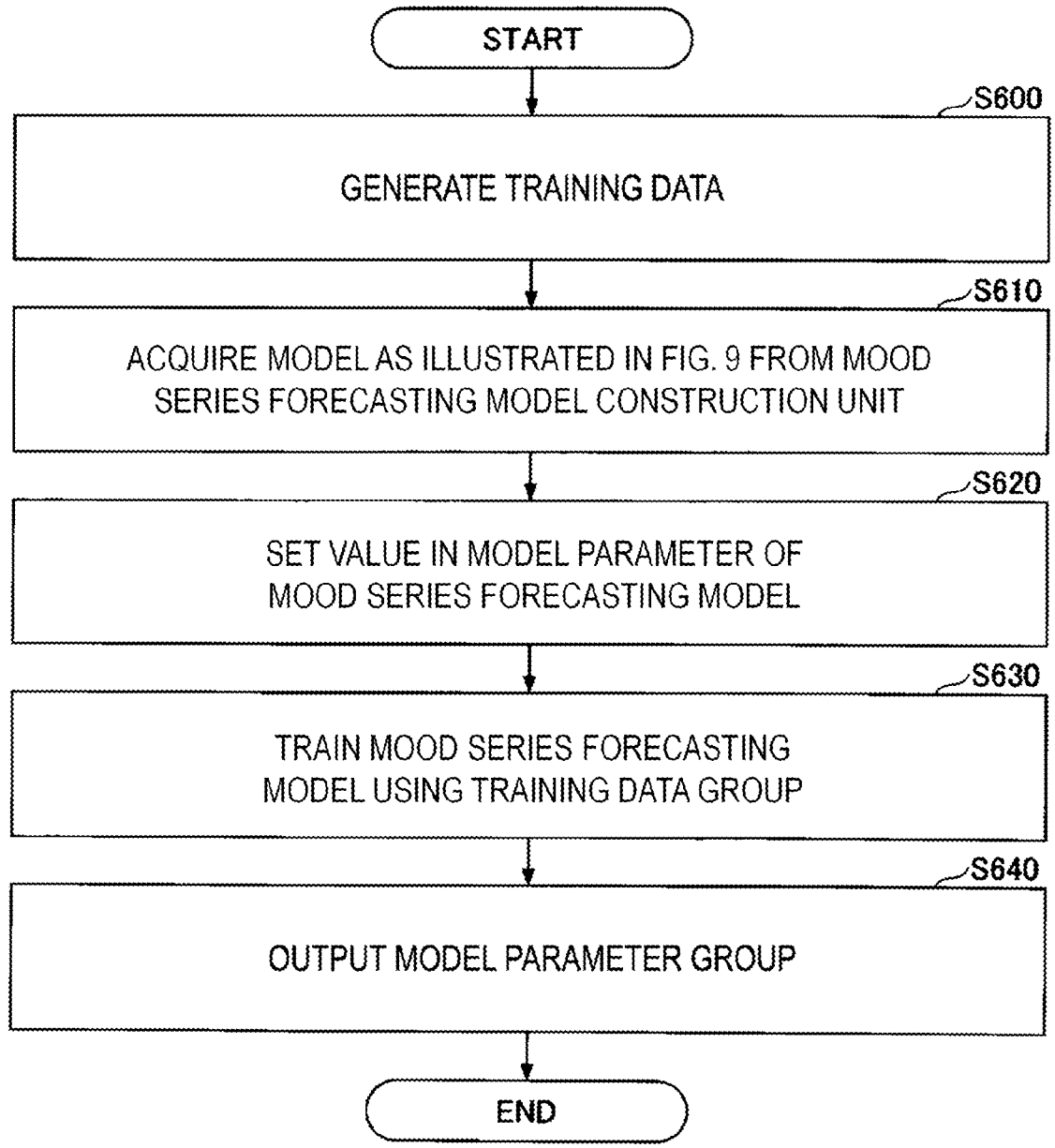
FIG. 15 is a flowchart illustrating an example of a processing procedure for a process of training a mood series forecasting model.

Next, the details of step S150 in FIG. 3 will be described. FIG. 15 is a flowchart illustrating an example of a processing procedure for a process of training a mood series forecasting model.

In step S600, the mood series forecasting model training unit 16 generates training data of the mood series forecasting model in accordance with the received behavior feature vector data series (FIG. 5) and the received mood data series (FIG. 6).

Specifically, the mood series forecasting model training unit 16 generates training data every day (data) including, as input data, the behavior feature vector series based on the behavior feature vector data series including the "date and time" related to the day after the day and the mood series based on the mood data series including the "date and time" related to the day and including, as output data, the mood series based on the mood data series including the "date and time" related to the day after the day. Accordingly, the training data is generated every date (every day).

Next, the mood series forecasting model training unit 16 receives the mood series forecasting model as illustrated in FIG. 9 from the mood series forecasting model construction unit 15 (S610). Hereinafter, the mood series forecasting model is referred to as a "target model".

Next, the mood series forecasting model training unit 16 sets a value in the model parameter of the target model (S620). Specifically, the mood series forecasting model training unit 16 accesses a DB such as the behavior series encoding model DB 123, the mood series encoding model DB 125, and the mood series decoding model DB 126 (hereinafter referred to as a "target model DB"), and in a case where the value of the model parameter of the model that has already been trained is saved in each of these DBs, the mood series forecasting model training unit 16 sets the value saved in each target model DB as the model parameter of each component of the target model. On the other hand, in a case where the parameter of the trained model is not saved in each of these target model DBs, the behavior series forecasting model training unit 14 initializes the model parameter of each component of the target model with, for example, a random number between 0 and 1. Meanwhile, the mood series decoding model DB 126 is a DB in which the values of the model parameters of the trained mood series decoding model are stored.

Next, the mood series forecasting model training unit 16 trains the target model using the training data group (S630). Specifically, the mood series forecasting model training unit 16 inputs, to the target model, the behavior feature vector series and the mood series that are included in the training data as input data for each piece of training data, and updates the model parameters of the target model in accordance with the comparison between the mood series which is output from the target model and the mood series included as output data in the training data.

Next, the mood series forecasting model training unit 16 outputs a model parameter group of the trained mood series forecasting model and stores the output result in each target model DB (S640). In this case, the content of a target model DB in which the value is already stored is overwritten. Among the target model DBs, the behavior series encoding model DB 123 and the mood series encoding model DB 125 are as illustrated in FIG. 12 or 13.

FIG. 16 is a diagram illustrating a configuration example of the mood series decoding model DB 126. As illustrated in FIG. 16, the model parameters of the RNN Decoding Layer are stored as a matrix in the mood series decoding model DB 126. In addition, for the output layer, the size of the output vector is adjusted so that the same index as the input mood data is allocated, and each index and the corresponding mood name are stored as text.

Figure 17:
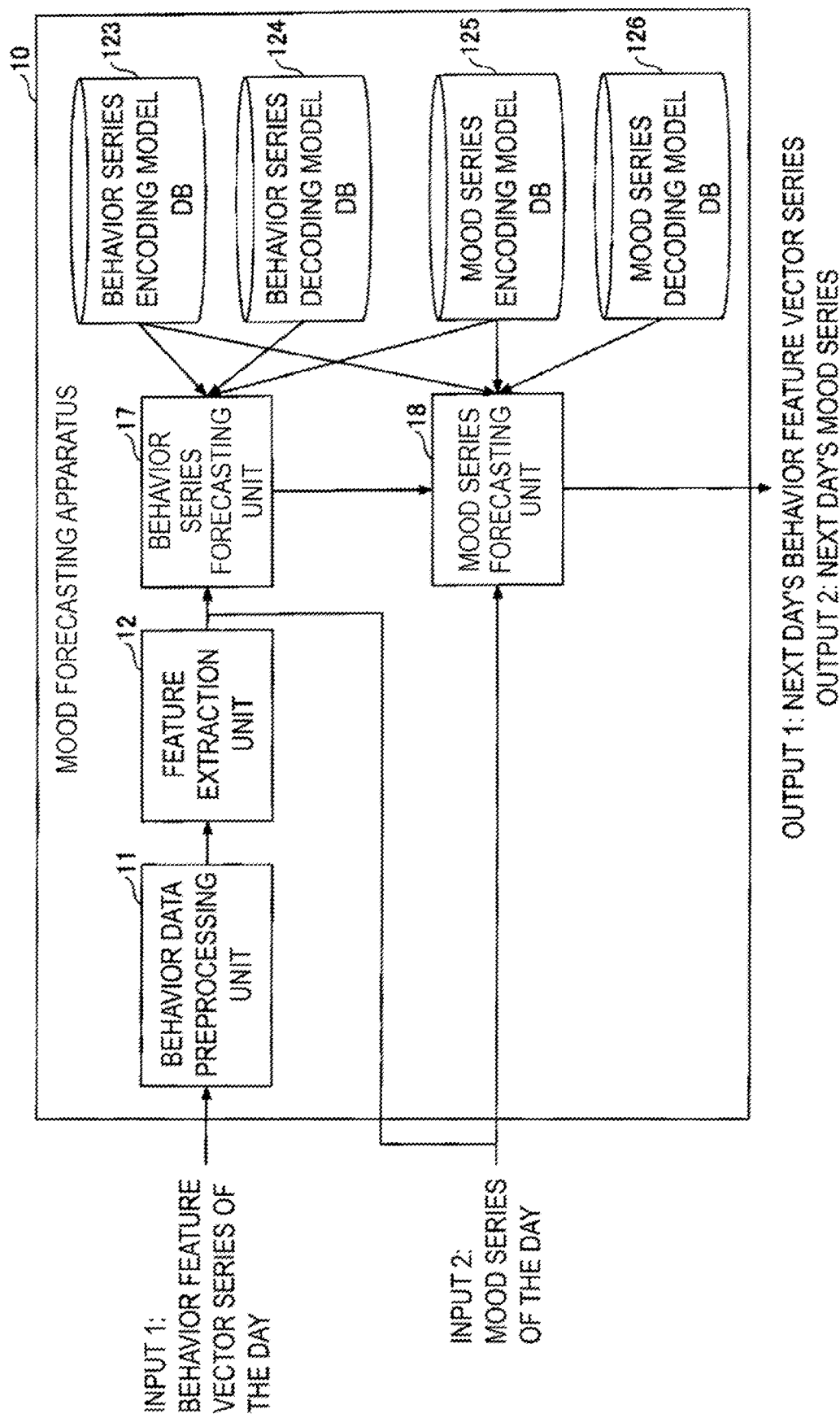
FIG. 17 is a diagram illustrating a functional configuration example in a forecasting phase of the mood forecasting apparatus 10 according to the embodiment of the present disclosure.

Next, a forecasting phase will be described. FIG. 17 is a diagram illustrating a functional configuration example in a forecasting phase of the mood forecasting apparatus 10 in the embodiment of the present disclosure. In FIG. 17, the same parts as those in FIG. 2 or the corresponding parts are designated by the same reference numerals.

In FIG. 17, the mood forecasting apparatus 10 includes the behavior data preprocessing unit 11, the feature extraction unit 12, a behavior series forecasting unit 17, a mood series forecasting unit 18, and the like. Each of these units is realized by one or more programs installed in the mood forecasting apparatus 10 causing the processor 104 to execute processing. In addition, the mood forecasting apparatus 10 uses the behavior series encoding model DB 123, the behavior series decoding model DB 124, the mood series encoding model DB 125, the mood series decoding model DB 126, and the like.

The mood forecasting apparatus 10 in the forecasting phase outputs a behavior series of the next day (the day after the day) and a mood series of the next day as the forecasting results for a behavior data series and a mood data series of a user B on the day before the forecasting target day (hereinafter referred to as "the day"). Meanwhile, the user B may be the same person as the user A or may be a different person.

Figure 18:
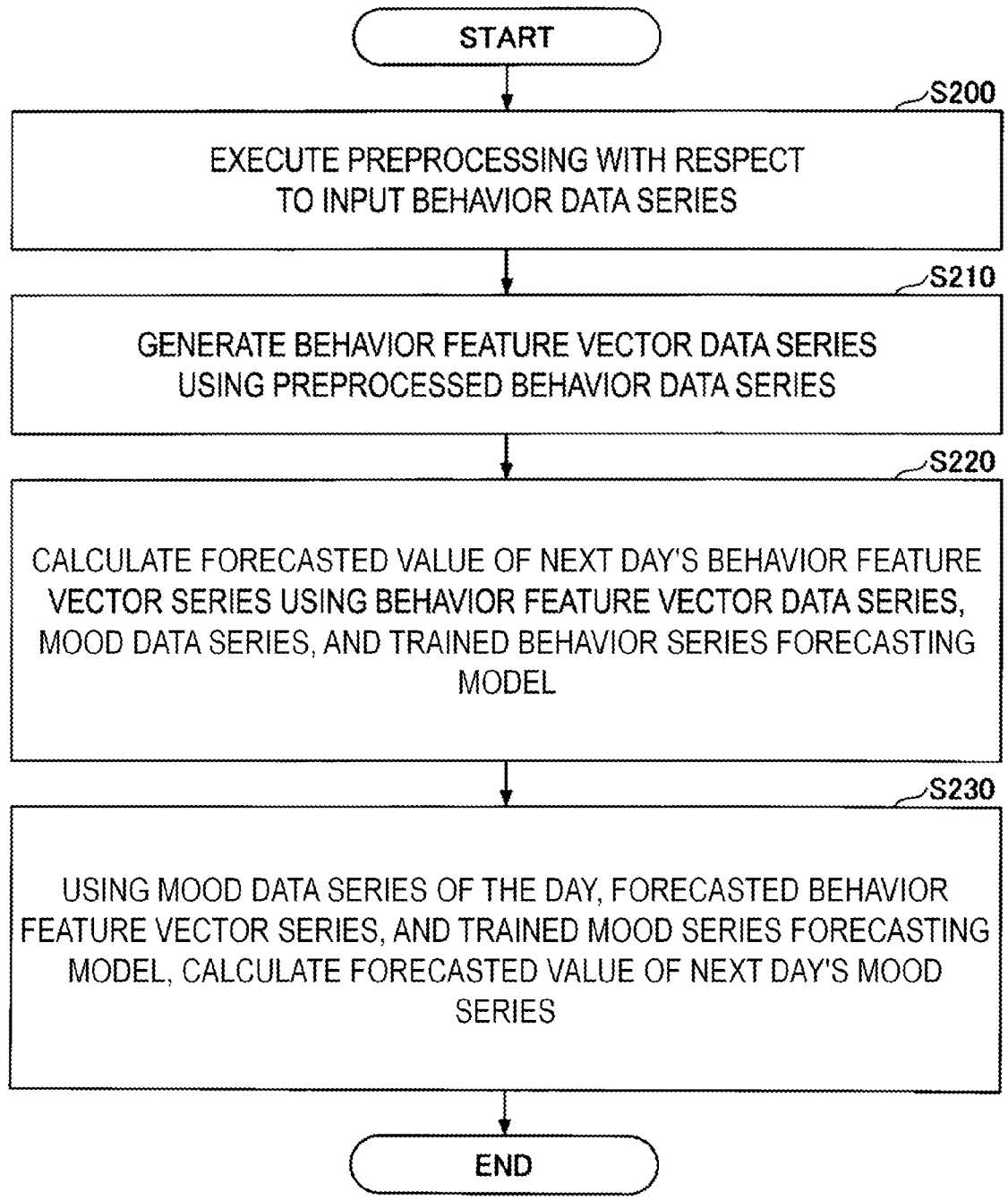
FIG. 18 is a flowchart illustrating an example of a processing procedure which is executed by the mood forecasting apparatus 10 in the forecasting phase.

FIG. 18 is a flowchart illustrating an example of a processing procedure which is executed by the mood forecasting apparatus 10 in the forecasting phase.

In step S200, the behavior data preprocessing unit 11 executes the preprocessing described in FIG. 7 with respect to the behavior data series of the day when the data is input.

Next, the feature extraction unit 12 receives the preprocessed behavior data series from the behavior data preprocessing unit 11 and generates a behavior feature vector data series by executing the process described in FIG. 8 for the preprocessed behavior data series (S210).

Next, the behavior series forecasting unit 17 inputs the mood data series of the day and the behavior feature vector data received from the feature extraction unit 12 to the trained behavior series forecasting model acquired from the behavior series encoding model DB 123, the behavior series decoding model DB 124, and the mood series encoding model DB 125, and calculates a forecasted value of the next day's behavior feature vector series (S220).

Next, the mood series forecasting unit 18 inputs the mood data series of the day and the next day's behavior feature vector series forecasted by the behavior series forecasting unit 17 to the trained mood series forecasting model acquired from the behavior series encoding model DB 123, the mood series encoding model DB 125, and the mood series decoding model DB 126, and calculates a forecasted value of the next day's mood series (S230). The mood series forecasting unit 18 outputs the forecasted value and a forecasted value of the next day's behavior series.

Figure 19:
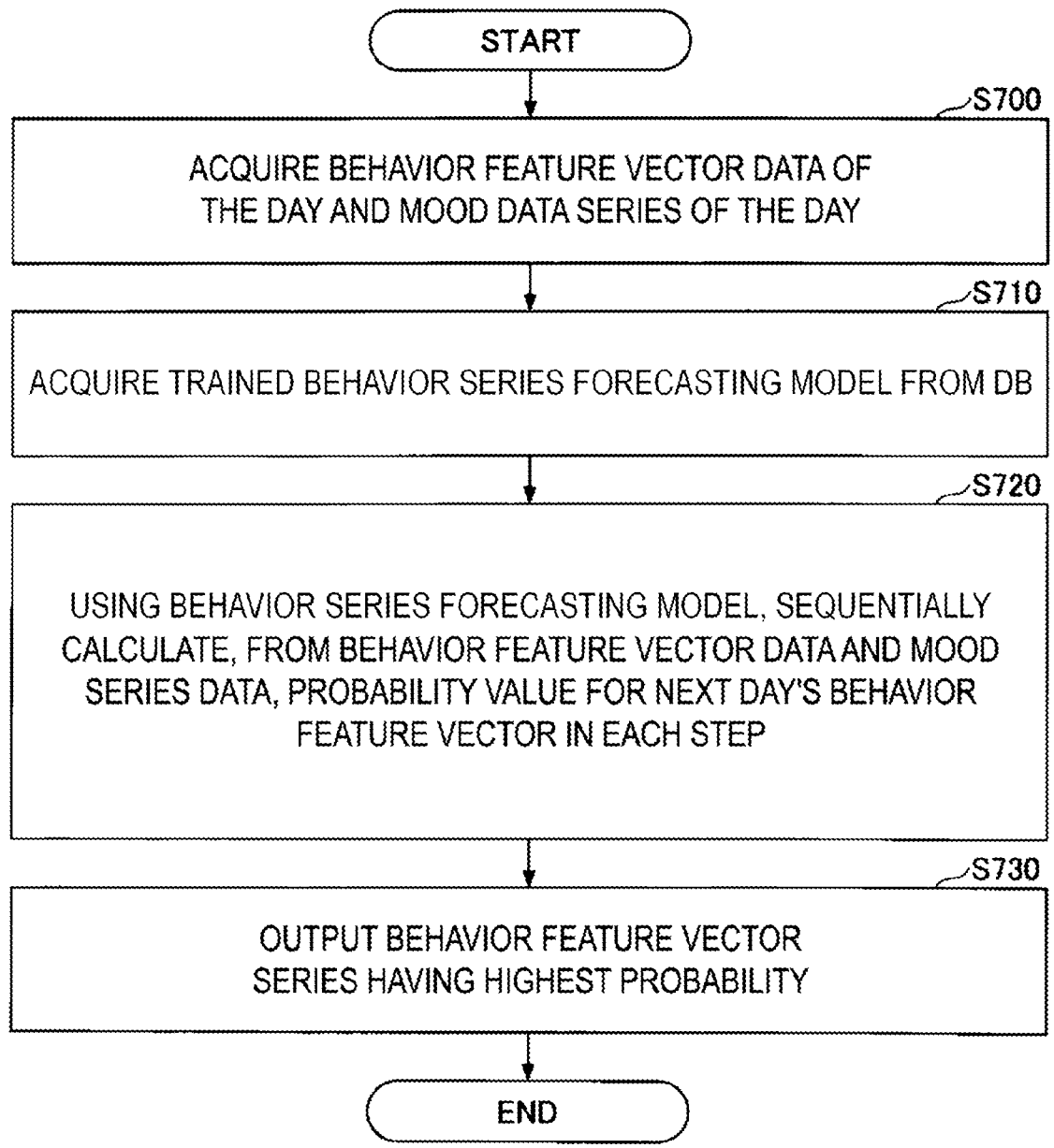
FIG. 19 is a flowchart illustrating an example of a processing procedure for a process of forecasting a behavior feature vector series.

Next, the details of step S220 in FIG. 18 will be described. FIG. 19 is a flowchart illustrating an example of a processing procedure for a process of forecasting a behavior feature vector series.

In S700, the behavior series forecasting unit 17 acquires a behavior feature vector data series based on the behavior data series of the day which is input data and a mood data series of the day which is input data.

Next, the behavior series forecasting unit 17 acquires the trained behavior series forecasting model from the behavior series encoding model DB 123, the behavior series decoding model DB 124, and the mood series encoding model DB 125 (S710).

Next, the behavior series forecasting unit 17 inputs the behavior feature vector series based on the behavior feature vector data series and the mood series based on the mood data series to the behavior series forecasting model, and sequentially calculates a probability value for the next day's behavior feature vector in each step (S720).

Next, the behavior series forecasting unit 17 outputs a series of a behavior feature vector having the highest probability to the mood series forecasting unit 18 (S730).

Figure 20:
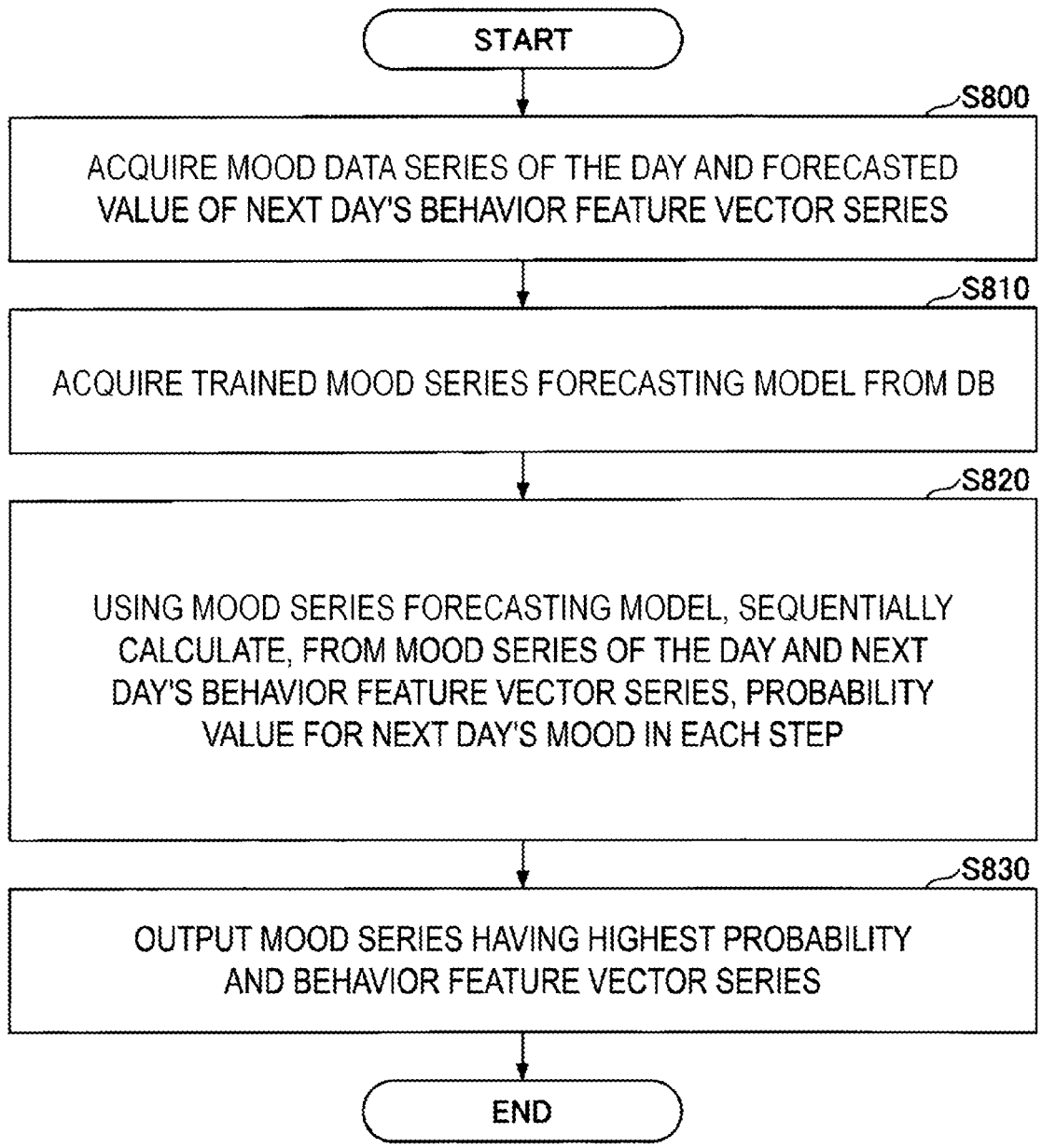
FIG. 20 is a flowchart illustrating an example of a processing procedure for a process of forecasting a mood series.

Next, the details of step S230 in FIG. 18 will be described. FIG. 20 is a flowchart illustrating an example of a processing procedure for a process of forecasting a mood series.

In step S800, the mood series forecasting unit 18 acquires the next day's behavior feature vector series forecasted by the behavior series forecasting unit 17 and the mood data series of the day which is input data.

Next, the mood series forecasting unit 18 acquires the trained mood series forecasting model from the behavior series encoding model DB 123, the mood series encoding model DB 125, and the mood series decoding model DB 126 (S810).

Next, the mood series forecasting unit 18 inputs the next day's behavior feature vector series o and the mood series based on the mood data series of the day to the mood series forecasting model, and sequentially calculates a probability value for the next day's mood in each step (S820).

Next, the mood series forecasting unit 18 outputs a series of a mood having the highest probability and the behavior feature vector series forecasted by the behavior series forecasting unit 17 (S830).

Meanwhile, in the present embodiment, although an example in which a time interval where the period T1 and the period T2 are divided into a plurality of periods is in units of one day has been described, the time interval may be a period of two days or more. In this case, a certain time interval may be applied to the above-stated day, and that the time interval following the certain time interval may be applied to the day after the day.

As described above, according to the present embodiment, it is possible to forecast a user's future mood series that could not be forecasted in the past by training the behavior series forecasting model and the mood series forecasting model in association of the behavior feature vector series extracted from the behavior data series with the mood data series in units of a common time interval (common date) and using the obtained model. In this case, by not only forecasting and presenting the user's future mood series but also presenting it together with the behavior feature vector series at the same time in the future, it is possible to give the interpretability of the forecasting result (behavior feature vector series which is the basis for the forecasting of the mood series). Accordingly, it is possible to forecast the future mood and to present the forecasting and a behavior that is the basis for the forecasting.

By presenting the future mood series and the behavior feature vector series together, it is possible to support the user to improve the mood series from a behavior in a case where the user wants to improve the mood series. For example, by inputting a behavior series of the next day edited by a user to the mood series forecasting unit 18, the result can be presented.

Meanwhile, by not only forecasting the next day's mood series and behavior series but also using the forecasting result in input data of the forecasting phase, the mood series and behavior series of the next day and the days after the next day may be forecasted.

Meanwhile, in the present embodiment, the behavior series forecasting model training unit 14 is an example of a first training unit. The mood series forecasting model training unit 16 is an example of a second training unit. The behavior series forecasting unit 17 is an example of a first forecasting unit. The mood series forecasting unit 18 is an example of a second forecasting unit. The behavior data series or the behavior feature vector series is an example of behavior time-series data. The mood data series or mood series is an example of mood time-series data. The behavior series forecasting model is an example of a first neural network. The mood series forecasting model is an example of a second neural network. The day is an example of a first time interval.

Hereinbefore, although the details of the present embodiment has been described, the present disclosure is not limited to such a specific embodiment, and can be modified and changed variously without departing from the scope of the invention described in the appended claims.

REFERENCE SIGNS LIST

10 Mood forecasting apparatus
11 Behavior data preprocessing unit
12 Feature extraction unit
13 Behavior series forecasting model construction unit
14 Behavior series forecasting model training unit
15 Mood series forecasting model construction unit
16 Mood series forecasting model training unit
17 Behavior series forecasting unit
18 Mood series forecasting unit
100 Drive device
101 Recording medium
102 Auxiliary storage device
103 Memory device
104 Processor
105 Interface device
121 Behavior series data DB
122 Mood series data DB
123 Behavior series encoding model DB
124 Behavior series decoding model DB
125 Mood series encoding model DB
126 Mood series decoding model DB
B Bus

The invention claimed is:

1. A mood forecasting method executed by a computer, the method comprising:
training a first neural network in accordance with behavior time-series data and mood time-series data per time interval where a certain period is divided into a plurality of periods, the first neural network using behavior time-series data and mood time-series data in a first time interval as input to output a forecasted value of behavior time-series data in a time interval following the first time interval; and
training a second neural network in accordance with behavior time-series data and mood time-series data per time interval where the certain period is divided into a plurality of periods, the second neural network using the behavior time-series data in the following time interval and the mood time-series data in the first time interval as input to output a forecasted value of mood time-series data in the following time interval.

2. The mood forecasting method according to claim 1 executed by a computer, the method further comprising:
inputting behavior time-series data and mood time-series data in a second time interval to the trained first neural network, and calculating a forecasted value of behavior time-series data in a time interval following the second time interval; and
inputting, to the trained second neural network, the forecasted value of the behavior time-series data in the time interval following the second time interval that has been calculated in the first forecasting procedure and the mood time-series data in the second time interval, and calculating a forecasted value of mood time-series data in the time interval following the second time interval.

3. A mood forecasting apparatus comprising:
a memory and a processor, wherein the processor is configured to:
train a first neural network in accordance with behavior time-series data and mood time-series data per time interval where a certain period is divided into a plurality of periods, the first neural network using behavior time-series data and mood time-series data in a first time interval as input to output a forecasted value of behavior time-series data in a time interval following the first time interval; and
train a second neural network in accordance with behavior time-series and mood time-series data per time interval where the certain period is divided into a plurality of periods, the second neural network using the behavior time-series data in the following time interval and the mood time-series data in the first time interval as input to output a forecasted value of mood time-series data in the following time interval.

4. The mood forecasting apparatus according to claim 3, wherein the processor is further configured to:
input behavior time-series data and mood time-series data in a second time interval to the trained first neural network to calculate a forecasted value of behavior time-series data in a time interval following the second time interval; and
input, to the trained second neural network, the forecasted value of the behavior time-series data in the time interval following the second time interval that has been calculated by the first forecasting unit and the mood time-series data in the second time interval to calculate a forecasted value of mood time-series data in the time interval following the second time interval.

5. A non-transitory computer-readable recording medium having computer readable instructions stored thereon to operate as the mood forecasting apparatus according to claim 3.

* * * * *